United States Patent [19]

Bellingham

[11] 3,939,245

[45] Feb. 17, 1976

[54] PROCESS FOR THE SEPARATION OF TUNGSTEN AND MOLYBDENUM

[75] Inventor: Andrew Irwin Bellingham, Artarmon, Australia

[73] Assignee: Warman Equipment (International) Limited, Artarmon, Australia

[22] Filed: Nov. 14, 1974

[21] Appl. No.: 523,797

[30] Foreign Application Priority Data

Nov. 19, 1973 Australia............................. 5700/73

[52] U.S. Cl..................................... 423/55; 423/58
[51] Int. Cl.² ................... C01G 39/00; C01G 41/00
[58] Field of Search .................. 423/55, 57, 58, 561

[56] References Cited
UNITED STATES PATENTS

| | | | |
|---|---|---|---|
| 2,339,888 | 1/1944 | Smith | 423/58 |
| 2,556,255 | 6/1951 | Barosella | 423/58 |
| 3,173,754 | 3/1965 | Kurtork | 423/57 |

Primary Examiner—Herbert T. Carter
Attorney, Agent, or Firm—Haseltine, Lake & Waters

[57] ABSTRACT

The known process of separating molybdenum from a tungsten-molybdenum containing alkaline solution has been improved by carrying out the chemical reaction between the solution treated with sulphuric acid and an added sodium bisulphide solution in a continuous process within a multi-stage stirred-tank reactor system, whereby the freed hydrogen sulphide is recycled for absorption by the alkaline solution thus reducing substantially the amount of additional sulphuric acid required for the reaction.

3 Claims, 1 Drawing Figure

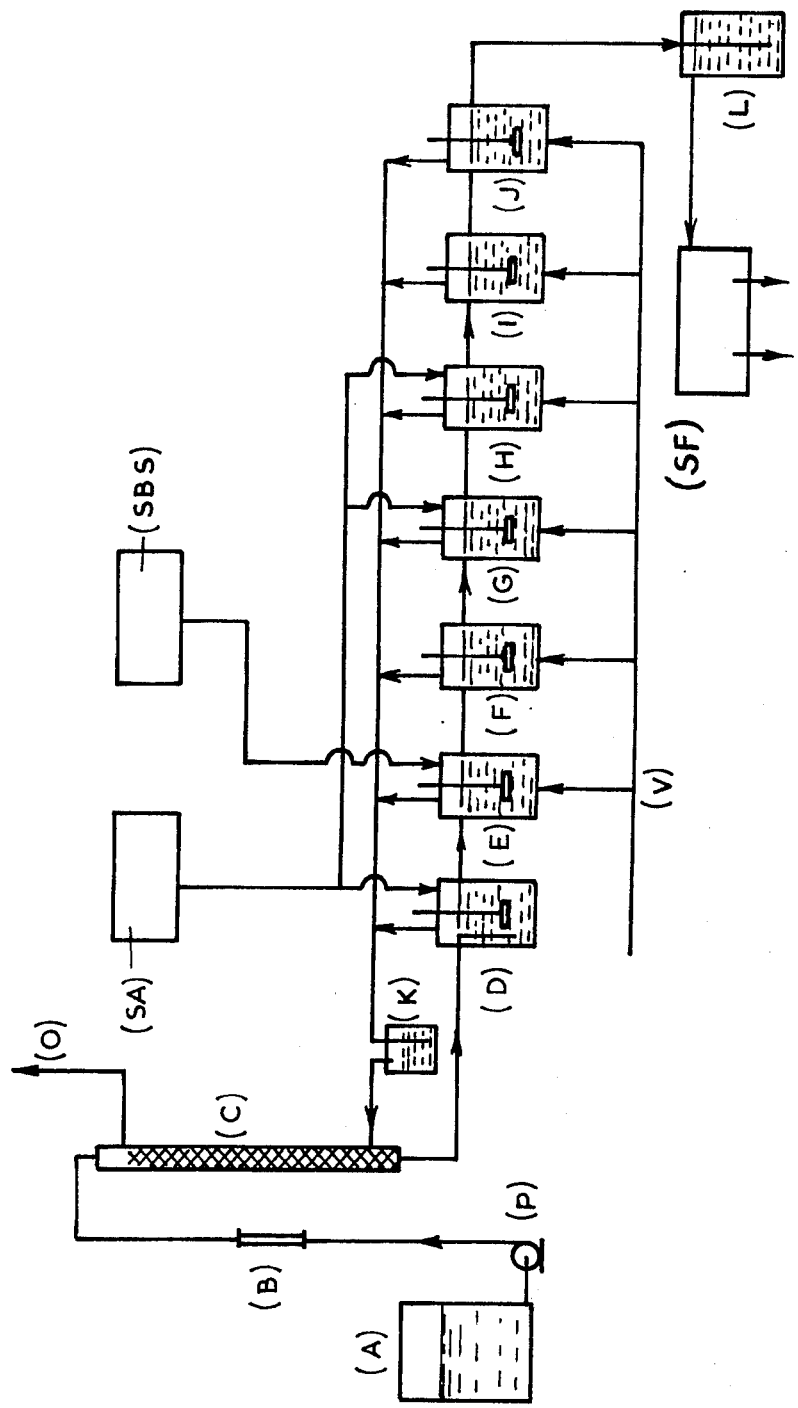

PROCESS FOR THE SEPARATION OF TUNGSTEN AND MOLYBDENUM

Scheelite is one of the commercial minerals of the metal tungsten. Its chemical composition is calcium tungstate, $CaWO_4$. In its natural state it is often closely associated with small quantities of the corresponding molybdenum mineral, powellite which is calcium molybdate, $CaMoO_4$. In physical beneficiation processes directed at recovering and concentrating scheelite, the powellite usually concentrates with the scheelite because of its similar characteristics and because its crystal form is often inter-grown with that of scheelite. Thus commercial scheelite concentrate is often contaminated with the molybdenum mineral and it usually suffers a market penalty on this account. A process also exists for the chemical beneficiation of molybdenum contaminated scheelite concentrate to a molybdenum-free or low-molybdenum product. In this process the complex tungsten and molybdenum minerals are dissolved in excess sodium carbonate and after separating the insoluble residue fraction there remains an alkaline solution in which the tungsten and molybdenum exist as sodium tungstate and sodium molybdate in excess sodium carbonate. The art of molybdenum-tungsten separation from an alkaline solution is well known.

A typical description of the art of molybdenum-tungsten separation is given in U.S. Pat. No. 3,173,754. This patent describes a process in which the pH of the alkaline molybdenum-tungsten solution is adjusted to pH 8 with sulphuric acid and there is then added to this solution at least 170 percent of the amount of alkali sulphide stoichiometrically required to convert the molybdenum contaminant to the thiomolybdate complex ion; the solution is then digested at elevated temperature to convert the molybdenum contaminant to the thiomolybdate complex ion; and then acidified to below pH 3.0 whereby the molybdenum is precipitated as molybdenum trisulphide; while the tungsten remains in solution as tungstic acid. The molybdenum precipitate is separated from the tungstic acid solution by filtration, and the tungsten is eventually recovered by adding sodium hydroxide to pH 8.5 and then adding the stoichiometric quantity of calcium chloride to reprecipitate calcium tungstate.

The chemical equations which describe the preferential precipitation of molybdenum trisulphide in the above tungsten-molybdenum separation process are as follows:

i. Sodium bisulphide reacts with the sodium molybdate to form sodium thiomolybdate,

ii. The addition of sulphuric acid to the alkaline thiomolybdate solution neutralises the sodium hydroxide and excess sodium carbonate remaining from the original dissolution step.

Carbon dioxide gas is released in the latter case.

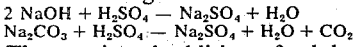

iii. The continued addition of sulphuric acid decomposes the thiomolybdate ion to precipitate molybdenum trisulphide and release hydrogen sulphide.

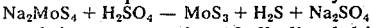

The minimum quantity of alkali sulphide used in this process is critical if complete or near-complete precipitation of molybdenum is to result. Thus while U.S. Pat. No. 3,173,754 specifies the minimum quantity at 170 percent of that stoichiometrically equivalent to the thiomolybdate ion, practical experience has suggested that results are more consistent if larger quantities of alkali sulphide are used, for example 2.0 to 2.5 equivalents.

The present invention is an improvement in the art of tungsten-molybdenum separation as described in the foregoing. In particular, the invention results in a lower consumption of alkali sulphide so that only about half that referred to in the foregoing is actually used. There is also a reduction in the consumption of sulphuric acid equivalent to the reduction in the sulphide consumption. The reduced sulphide consumption which is the main object of this invention is achieved by a process for the separation of tungsten and molybdenum from a molybdenum and tungsten containing alkaline solution wherein the solution is treated with sulphuric acid and is then reacted with a sodium bisulphide solution in a reactor system in a continuous process in which excess hydrogen sulphide contained in the gases freed by the reaction is recycled for absorption by said molybdenum and tungsten containing alkaline solution.

By using a multi-stage continouos stirred-tank reactor system it is possible to control the gaseous atmosphere in the separate reactors so that at the completion of the precipitation the atmosphere is virtually 100 percent hydrogen sulphide which fact results in more of the molybdenum being precipitated than would otherwise be possible from a noncontrolled atmosphere.

In one form of the invention the pressure of the gases in the precipitation reactors is increased above atmospheric pressure with the result that more of the molybdenum would be precipitated than would otherwise be possible from an operation at atmospheric pressure. At the same time air and other diluent gases are prevented from entering the gaseous atmosphere in the reactors.

One embodiment of the invention will be described hereinafter in more detail in connection with the drawing which shows a flowsheet diagram of a plant for carrying out the invention. In one example approximately 7500 liters of alkaline tungsten-molybdenum liquor where processed at a rate of 500 milliters per minute for the precipitation of molybdenum trisulphide and the eventual preparation of 500 kg of calcium tungstate containing less that 10 p.p.m. molybdenum.

In the drawing the supply tank (A) contains the source of carbonate liquor which is pumped by a pump (P) through a rotameter control (B) to the top of an absorption tower (C) packed with raschig rings. The internal diameter of the tower in the case of the before-mentioned example was 50 mm and the height of the packing was 1500 mm. After passing down through the tower, the liquor flows into an agitator (D) of, for example 15 liter, where sulphuric acid from a supply (SA) is automatically added to maintain a pH of 8.5 in the agitator. The continuously flowing liquor is then passed progressively through six heated, stirred tank reactors in series, (E), (F), (G), (H), (I), (J), the heating being schematically indicated by the steam pipe (V). To the first reactor (E), a metered stream of 30 percent sodium bisulphide solution from a supply (SBS) is added to maintain a more-or-less constant, predetermined concentration of sulphide in solution in reactor (E), the concentration being determined from time-to-time by sampling and titrating the said liquor.

The second reactor (F) is simply a holding reactor provided to allow sufficient time to elapse for the formation of the thiomolybdate complex ion before the liquor is passed into (G) where a constant stream of sulphuric acid from a supply (SA) is added to maintain the contained liquor within the pH range 6.5 to 7.0. The liquor flows then from (G) to (H) where a similar stream of acid from supply (SA) is added to maintain the liquor pH within the range 2.0 to 2.5. It is within reactor (H) that precipitation of molybdenum trisulphide commences; it continues in reactors (I) and (J) which are holding reactors to allow sufficient time to pass for the complete precipitation of molybdenum trisulphide before the emerging slurry after passing through a pressure seal (L) is filtered by a filter arrangement (SF) for physical separation of molybdenum trisulphide from the remaining tungstic acid solution. There is a substantial stream of carbon dioxide released from the agitator (D), and the reactors (G) and (H), as sulphuric acid is added to the liquor therein. Similarly, a substantial stream of hydrogen sulphide is released from reactor (H) and lesser amounts from reactors (I) and (J) as the gas ex-solved from these liquors is supersaturated in respect to hydrogen sulphide.

A particular additional feature of this invention is that by doing the precipitation in the above-described continuous manner as opposed to batch operations known hitherto, the steady stream of gases which is generated from within each reactor is devoid of oxygen since each reactor can be sealed from the atmosphere. Therefore the gas stream can be passed into the absorbing tower (C) so that the hydrogen sulphide component of the gas is absorbed by the alkali without danger of loss by oxidation and any remaining gases are released through the outlet (O). The hydrogen sulphide gas on being absorbed in the solution partly neutralises some of the excess alkali and forms sodium sulphide which is then available for re-use in the process.

By absorbing the released hydrogen sulphide in the advancing alkali stream, the sulphide content of the advancing liquor in reactor (F) can be raised to several hundred percent of the theoretical quantity for thiomolybdate formation (this being a considerable advantage in respect of complete molybdenum trisulphide precipitation) without the overall sulphide consumption being significantly in excess of that theoretically required to form molybdenum trisulphide.

As the acid component of the sulphide gas neutralises its equivalent in the advancing alkali there is a saving in the amount of acid compared with that which would be used by a process in which the gas recycle technique was not used.

By employing a throttling valve or a constant pressure device (K) as shown in the drawing, a back pressure of hydrogen sulphide can build up in reactors (H), (I) and (J) with the result that there is less tendency for this gas to be released from solution and a consequently greater tendency to complete molybdenum precipitation. In the example described above, approximately 7500 liters of sodium carbonate leach liquor were produced by autoclaving five, 1-tonne batches of flotation concentrate containing 14 to 16 percent tungstic oxide and 1.0 to 1.5 percent $MoO_3$. After filtration and washing, the bulked leach liquors contained,

| tungstic oxide | 71.1 g $WO_3$/liter |
| molybdenum oxide | 3.2 g $MoO_3$/liter |
| sodium carbonate | 48.1 g $Na_2CO_3$/liter |
| sodium bicarbonate | 5.8 g $NaHCO_3$/liter |
| pH | 10.5 |

This liquor was then fed through the equipment as described in the foregoing. A record was kept of the sodium bisulphide and sulphuric acid added, as well as the sodium bisulphide concentration in reactor (F) and the hydrogen sulphide content of the gases leaving the absorbing tower (C). The tungstic acid solution containing the precipitated molybdenum trisulphide was flocced and samples of the slurry stream were filtered at regular intervals.

The molybdenum in the filtrate was determined by chemical analysis.

Typical results of several 5 to 8 hour operating periods are shown in Table 1:

TABLE 1

| Volume processed (liters) | Ave. NaHS concentration in reactor (F) | | NaHS used | | $MoO_3$ in filtrate | Ave. $H_2S$ in off-gases | $H_2SO_4$ used g/g $WO_3$ |
|---|---|---|---|---|---|---|---|
| | g/l | % of one NaHS * equivalent | g/g $MoO_3$ | % of one NaHS * equivalent | p.p.m. | % | |
| 155 | 14.5 | 290 | 1.18 | 75.6 | 1.0 | 0.15 | 1.16 |
| 174 | 12.4 | 248 | 1.19 | 69.6 | 1.0 | 0.1 | 1.17 |
| 130 | 8.4 | 168 | 1.94 | 124.5 | 3.0 | 0.0 | 1.36 |
| 201 | 11.4 | 228 | 1.62 | 104.1 | 1.0 | 0.0 | 0.98 |

* Relative to the thiomolybdate ion.

From the table it can be seen that while the average concentration of sodium bisulphide in reactor (F) could be maintained in excess of 200 percent of the stoichiometric equivalent to form the $MoS_4$ ion, the actual sodium bisulphide consumption ranged from only 69.6 percent to 124.5 percent of one $MoS_4$ ion equivalent (the lower limit being approximately one $MoS_3$ equivalent). Further it was shown that when the sodium bisulphide concentration in reactor (F) dropped to approximately 170 percent of one $MoS_4$ equivalent and less, the molybdenum remaining in the final filtrate increased in quantity. Molybdenum concentration in excess of 100 p.p.m. $MoO_3$ resulted when the sodium bisulphide equivalent was only 100 percent of the amount required for the formation of the $MoS_4$ ion.

In demonstrating the complete absorption of the hydrogen sulphide gas in the advancing alkaline liquor, the acid component of the gas was thus available for neutralisation in accordance with the following equation.

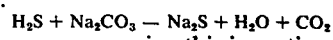
$H_2S + Na_2CO_3 \rightarrow Na_2S + H_2O + CO_2$

Thus a process using this invention would consume less sulphuric acid compared with a process not incorporating the invention. The saving in sulphuric acid would be that equivalent to the sulphide added in excess of the $MoS_3$ equivalent.

In the plant described in the foregoing, the pressure in the reactors was maintained at 50 to 100 mm, watergauge, above atmospheric pressure by causing the gases to bubble through a submerged tube at the constant pressure device (K). It was found that this slight positive pressure was beneficial in promoting complete molybdenum precipitation since it was observed that when leaks developed around the glands of the agitator shafts in the reactors, there was invariably an increase in the residual molybdenum in the tungstic acid filtrate.

Pressures higher than that mentioned above will result in more rapid precipitation of molybdenum trisulphide. The detailed description given above refers only to one example of the application of the invention and the invention is not restricted thereto.

I claim:

1. A process for the separation of tungsten and molybdenum from a molybdenum- and tungsten-containing alkaline solution wherein the solution is treated in a reactor system in a continuous process, including the steps of adding sulphuric acid to maintain the solution at a pH value of about 8.5, progressively passing the solution through a series of reactor stages at elevated temperature and adding an alkali metal sulphide solution equal to no more than about the stoichiometric equivalent necessary to form the thiomolybdate ion with the molybdenum in solution, adding a further amount of sulphuric acid to maintain the solution at a pH value of 2.0 to 2.5, precipitating molybdenum trisulphide during the reaction under evolution of hydrogen sulphide, recycling said hydrogen sulphide for absorption by said molybdenum- and tungsten-containing alkaline solution, and separating the precipitated molybdenum trisulphide from the remaining solution.

2. A process according to claim 1 wherein the alkaline solution is progressively reacted in said series of reactor stages under stirring.

3. A process according to claim 1 wherein the pressure within the reactor system is held at a value higher than atmospheric pressure thus preventing any diluent gases from entering any of the reactor stages.

* * * * *